United States Patent
Wang et al.

(10) Patent No.: US 7,353,138 B2
(45) Date of Patent: Apr. 1, 2008

(54) SYSTEM STATE MONITORING CIRCUIT

(75) Inventors: Xian-Ming Wang, Shenzhen (CN);
Guang-Dong Yuan, Shenzhen (CN);
Chung-Chi Huang, Tu-Cheng (TW);
Hsiu-Chang Lai, Tu-Cheng (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/309,536

(22) Filed: Aug. 18, 2006

(65) Prior Publication Data
US 2007/0075754 A1 Apr. 5, 2007

(30) Foreign Application Priority Data
Sep. 16, 2005 (CN) .................. 2005 1 0037357

(51) Int. Cl.
*G06F 15/00* (2006.01)
(52) U.S. Cl. ........................ 702/177; 709/223
(58) Field of Classification Search ............ 702/177, 702/176, 182–185, 188; 709/201, 209, 223
See application file for complete search history.

(56) References Cited

U.S. PATENT DOCUMENTS

| 4,803,682 A | 2/1989 | Hara et al. |
| 6,298,370 B1 * | 10/2001 | Tang et al. .................. 718/102 |
| 2004/0250178 A1 | 12/2004 | Mungula et al. |

OTHER PUBLICATIONS

Wei-Hua Ma, "The Technique of Extending Multi-Parallel Ports Based on I2C-Bus", Microelectronics & Computer, Sep. 30, 2002, pp. 31-33, China.

* cited by examiner

*Primary Examiner*—Edward Raymond
(74) *Attorney, Agent, or Firm*—Wei Te Chung

(57) ABSTRACT

An exemplary state monitoring circuit includes a data transform unit, a counter, and a clock generator. The data transform unit is connected to a system management bus (SMBUS) to obtain serial signals output from the SMBUS, and convert the serial signals to parallel signals. The counter is connected to a south bridge chip of the system and the data transform unit, for counting parallel signals converted by the data transform unit, if the count is finished, the counter sends a reset signal to the south bridge chip. The clock generator is connected to the counter for providing a clock frequency signal to the counter.

15 Claims, 2 Drawing Sheets

SYSTEM STATE MONITORING CIRCUIT

DESCRIPTION

1. Field of the Invention

The present invention generally relates to monitoring circuits, and more particularly to a state monitoring circuit in a communication system.

2. Description of Related Art

In a communication system, it is important to detect a state of the system. If the system is in an abnormal state, failures may occur. Examples of failures include invalid data being provided, slow response time, and the inability for a service to take a request.

The System Management Bus (SMBUS) is a two-wire interface through which simple system and power management related chips can communicate with the rest of the system. When the system is in the normal state, the SMBUS has two lines SMBCLK and SMBDATA transmitting signals; when the system is not in the normal state, there are no signals being transmitted in the two lines SMBCLK and SMBDATA.

What is needed is a monitoring circuit which is connected for monitoring the system state based on the signals from the two lines SMBCLK and SMBDATA and for restarting the system if the system is not in the normal state.

SUMMARY OF THE INVENTION

In one preferred embodiment, a state monitoring circuit includes a data transform unit, a counter, and a clock generator. The data transform unit is connected to a system management bus (SMBUS) to obtain signals output from the SMBUS, and convert the signals from a serial format to a parallel format. The counter is connected to a south bridge chip of the system and the data transform unit, for counting signals converted by the data transform unit, if the count is finished, the counter sends a reset signal to the south bridge chip. The clock generator is connected to the counter for providing a clock frequency signal to the counter.

Other advantages and novel features will become more apparent from the following detailed description when taken in conjunction with the accompanying drawings, in which:

DETAILED DESCRIPTION OF THE INVENTION

Figure 1:
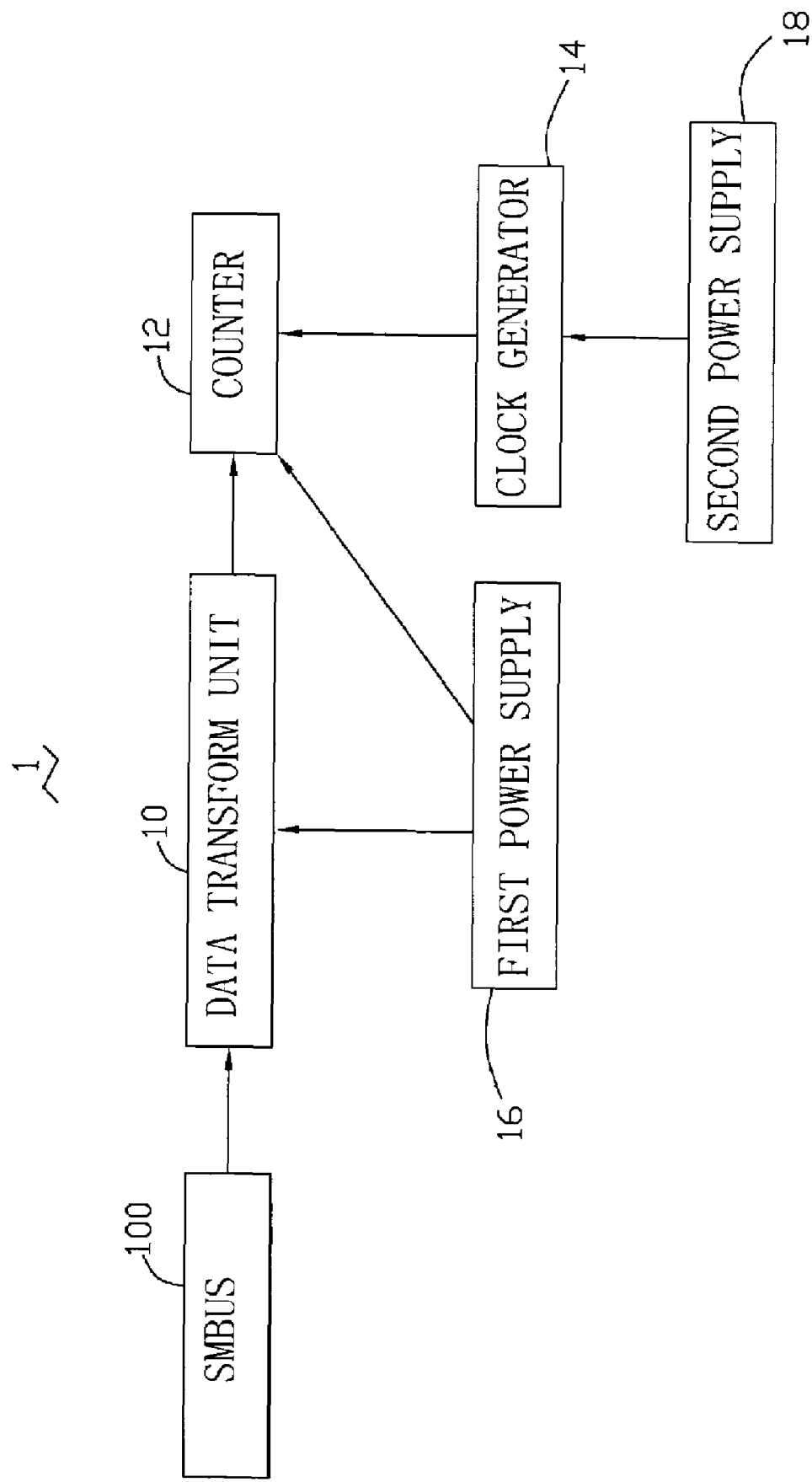
FIG. 1 is a block diagram of a system state monitoring circuit in accordance with a preferred embodiment of the present invention.

Referring to FIG. 1, a system state monitoring circuit 1 in according with a preferred embodiment of the present invention includes a data transform unit 10, a counter 12, a clock generator 14, a first power supply 16, and a second power supply 18. The data transform unit 10 is connected to an SMBUS 100 and obtains a serial signal output from the SMBUS 100. The data transform unit 10 converts the serial signal to a parallel signal. The converted parallel signal is then sent to the counter 12. In this embodiment, the counter 12 is a down counter. The clock generator 14 is connected to the counter 12 to output a predetermined clock frequency signal to the counter 12. The first power supply 16 is connected to the counter 12 and the data transform unit 10. The second power supply 18 is connected to the clock generator 14.

Figure 2:
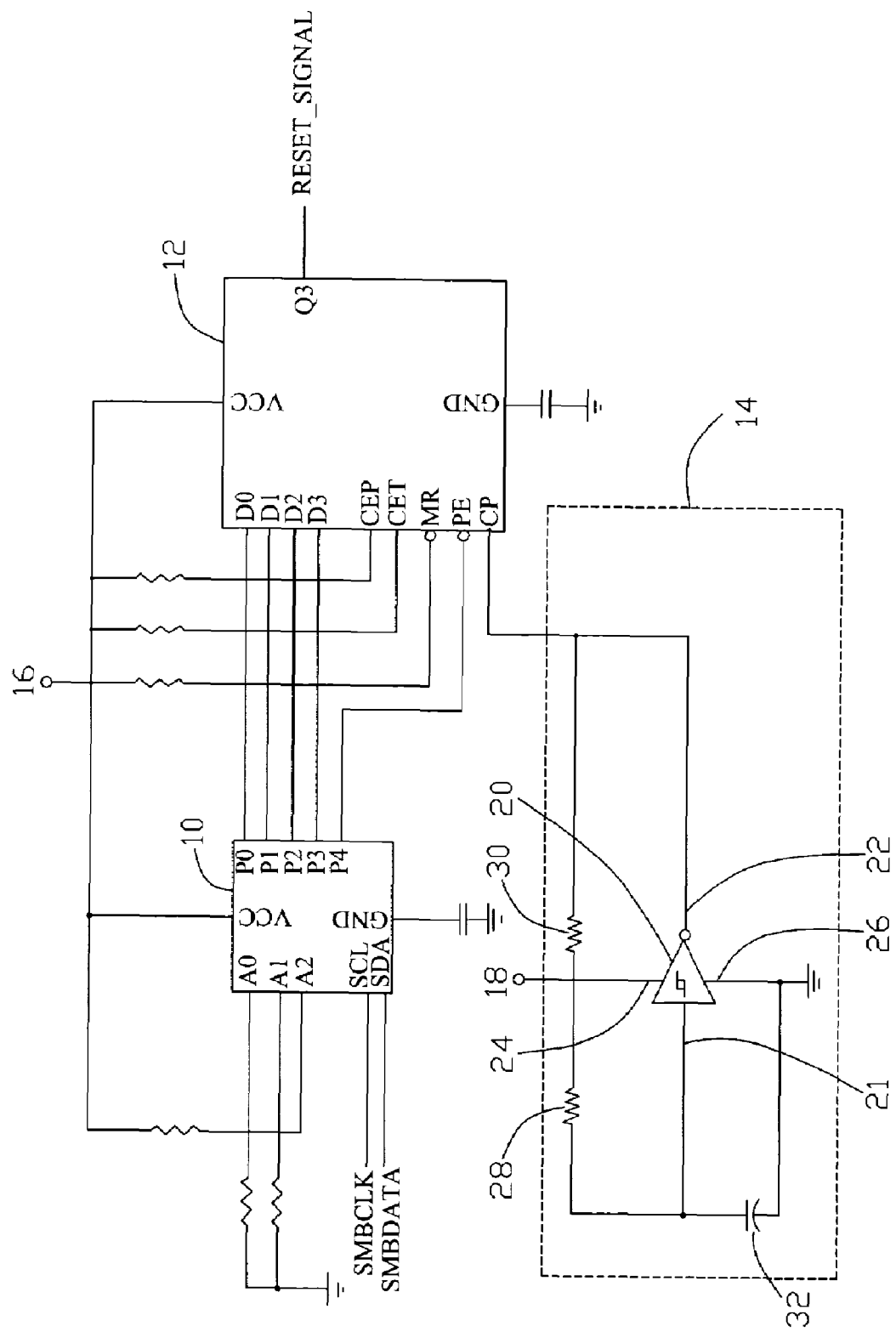
FIG. 2 is a circuit diagram of the system state monitoring circuit of FIG. 1.

Referring to FIG. 2, a circuit diagram of the system state monitoring circuit is shown. The first power supply provides a voltage with 5V, and the second power supply provides a voltage with 3.3V.

The data transform unit 10 is, in this preferred embodiment, a PCF8574 chip. The data transform chip 10 comprises two input pins SCL (serial clock line) and SDA (serial data line), a power pin VCC, a ground pin GND, three state indicator pins A0~A2, four output pins P0~P3, and a control pin P4. The input pins SCL and SDA are connected to lines SMBCLK and SMBDATA of the SMBUS 100 respectively. The VCC pin is connected to the first power supply 16, the GND pin is connected to the ground. The state indicator pins A0 and A1 are grounded, and the state indicator pin A2 is connected to the first power supply 16.

The counter 12 comprises four input pins D0~D3, an out pin Q3, a parallel enable pin PE, a power pin VCC, a ground pin GND, a clock pin CP, and three control pins CEP, CET and MR. The D0~D3 pins are connected to the P0~P3 pins of the data transform unit 10 respectively. The VCC pin is connected to the first power supply 16, and the GND pin is grounded. The CEP, CET, and MR pins are all connected to the first power supply 16. The PE pin is connected to the P4 pin of the data transform unit 10. The Q3 pin is connected to a south bridge to output a reset signal.

The clock generator 14 comprises a Schmitt trigger 20, a capacitor 32, and two resistors 28 and 30. The trigger 20 is, in this preferred embodiment, a 14106B chip. The trigger 20 comprises an input pin 21, an out put pin 22, a power pin 24, and a ground pin 26. The input pin 21 is connected to the output pin 22 via the resistors 28 and 30. The input pin 21 is connected to ground via the capacitor 32. The output pin 22 is connected to the CP pin of the counter 12. The power pin 24 is connected to the second power supply 18, and the ground pin 26 is grounded. In this embodiment, the resistance of the resistors 28 and 30 are 52.2K ohm, the capacitance of the capacitor is 10 uF, and the clock generator 14 provides a clock period of 900 mS, the maximum counter value of the counter 12 is 16.

In operation, if the system is in a normal state, the SMBUS 100 transmits signals to the data transform unit 10 through the SMBCLK line and SMBDATA line, the signals are transformed into parallel signals in the data transform unit 10 then sent to the counter 12. There is no reset signal output from the counter 12 due to the continuous data transmission from the SMBUS 100. If the system is in an abnormal state, the SMBUS 100 does not transmit serial signals to the data transform unit 10, when a last parallel signal sent before the system enters into abnormal condition is counted down to zero, the counter 12 sends a reset signal to a south bridge chip of the system for resetting the system. Because the maximum count value of the counter 12 is 16, the system will be reset less than 14.4 S(16×900 ms) after the system enters into the abnormal condition.

It is to be understood, however, that even though numerous characteristics and advantages of the present embodiments have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A state monitoring circuit for a system comprising:
   a data transform unit connected to a system management bus (SMBUS) configured for obtaining serial format signals output from the SMBUS, and converting the serial format signals to parallel format signals;
   a counter configured for being electrically connected to a south bridge chip of the system and the data transform unit, for counting the parallel format signals converted by the data transform unit, if the count is finished, the counter sending a reset signal to the south bridge chip; and
   a clock generator connected to the counter for providing a clock frequency signal to the counter.

2. The state monitoring circuit as claimed in claim 1, wherein the data transform unit comprises two input pins connected to the SMBUS, a control pin, and a plurality of output pins; the counter comprises a plurality of input pins connected to the output pins of the data transform unit, an output pin connected to the south bridge chip, a parallel enable pin connected to the control pin of the data transform unit, a clock pin connected to the clock generator, and a plurality of control pins connected to a first power supply.

3. The state monitoring circuit as claimed in claim 2, wherein the data transform unit comprises a power pin connected to the first power supply and a ground pin connected to ground; the counter comprises a power pin connected to the first power supply and a ground pin connected to ground.

4. The state monitoring circuit as claimed in claim 3, wherein the data transform unit comprises three state indicator pins, one of the indicator pins is connected to the first power supply, and the other two of the indicator pins are grounded.

5. The state monitoring circuit as claimed in claim 2, wherein the data transform unit is a PCF8574 chip.

6. The state monitoring circuit as claimed in claim 2, wherein the counter is a down counter, when the parallel signal is counted down to zero, the counter emits the reset signal.

7. The state monitoring circuit as claimed in claim 1, wherein the clock generator comprises a Schmitt trigger, an input pin of the Schmitt trigger is connected to an output pin of the Schmitt trigger via two resistors, the input pin of the Schmitt trigger is also connected to ground via a capacitor, the output pin of the Schmitt trigger is connected to the counter.

8. The state monitoring circuit as claimed in claim 7, wherein the Schmitt trigger comprises a power pin connected to a second power supply, and a ground pin connected to ground.

9. The state monitoring circuit as claimed in claim 7, wherein the Schmitt trigger is a 14106B chip.

10. A state monitoring circuit comprising:
    a system management bus (SMBUS) comprising a clock line and a data line; a data transform unit connected to the SMBUS configured for receiving signals sent through the clock line and the data line of the SMBUS, and converting the signals from a serial format to a parallel format; and
    a counter electrically connected to the data transform unit and a south bridge chip, if a time that the SMBUS does not send signals to the data transform unit is longer than a maximum counter time of the counter, the counter sends a reset signal to the south bridge chip.

11. The state monitoring circuit as claimed in claim 10, further comprising a clock generator, the clock generator is connected to the counter for providing a clock frequency signal to the counter.

12. The state monitoring circuit as claimed in claim 11, wherein the clock generator comprises a Schmitt trigger, an input pin of the Schmitt trigger is connected to an output pin of the Schmitt trigger via two resistors, the input pin of the Schmitt trigger is also connected to ground via a capacitor, the output pin of the Schmitt trigger is connected to the counter.

13. The state monitoring circuit as claimed in claim 12, wherein the Schmitt trigger is a 14106B chip.

14. The state monitoring circuit as claimed in claim 10, wherein the data transform unit is a PCF8574 chip.

15. The state monitoring circuit as claimed in claim 10, wherein the counter comprises an output pin configured for electrically coupling to the south bridge chip of a system to be monitored for sending the reset signal to the south bridge chip.

* * * * *